United States Patent [19]

Sawdon

[11] Patent Number: 5,190,334
[45] Date of Patent: Mar. 2, 1993

[54] POWERED CLAMP WITH PARALLEL JAWS

[75] Inventor: Edwin G. Sawdon, St. Clair, Mich.

[73] Assignee: BTM Corporation, Marysville, Mich.

[21] Appl. No.: 667,445

[22] Filed: Mar. 11, 1991

[51] Int. Cl.5 .............................................. B25J 15/08
[52] U.S. Cl. ...................................... 294/88; 294/94; 294/119.1
[58] Field of Search ................ 294/94, 119.1, 96, 88, 294/86.25, 86.3

[56] References Cited

U.S. PATENT DOCUMENTS

| 1,790,761 | 2/1931 | Ortolon | 294/94 |
| 3,863,961 | 2/1975 | Dinning | 294/86.25 X |
| 4,273,372 | 6/1981 | Sheshtawy | 294/86.25 X |
| 4,865,375 | 9/1989 | Laub et al. | 294/119.1 X |

FOREIGN PATENT DOCUMENTS

| 3306526 | 8/1984 | Fed. Rep. of Germany |  |
| 129871 | 2/1978 | German Democratic Rep. | 294/119.1 |

Primary Examiner—Charles A. Marmor
Assistant Examiner—Joseph D. Pape
Attorney, Agent, or Firm—Harness, Dickey & Pierce

[57] ABSTRACT

An improved clamping mechanism for removably clamping an object having at least two jaws that clampingly engage surfaces upon the object. This clamping mechanism utilizes a housing that has a chamber and a plurality of passages that lead radially from the chamber through the housing walls. A camming member is disposed within the chamber and is engaged with a plurality of follower members that are partially disposed within the radial passages. An actuating member actuates this camming member axially within the chamber to cam the follower members radially inward or outward, thereby radially displacing the jaws which are attached to the follower members. Since the follower members are shaped to correspond with the radial passages, the follower members slidingly engage with the radial passages. This engagement between the follower members and the passage walls restricts the displacement of the follower members, and thus the jaws, to purely translational displacement, radially inward and outward.

15 Claims, 3 Drawing Sheets

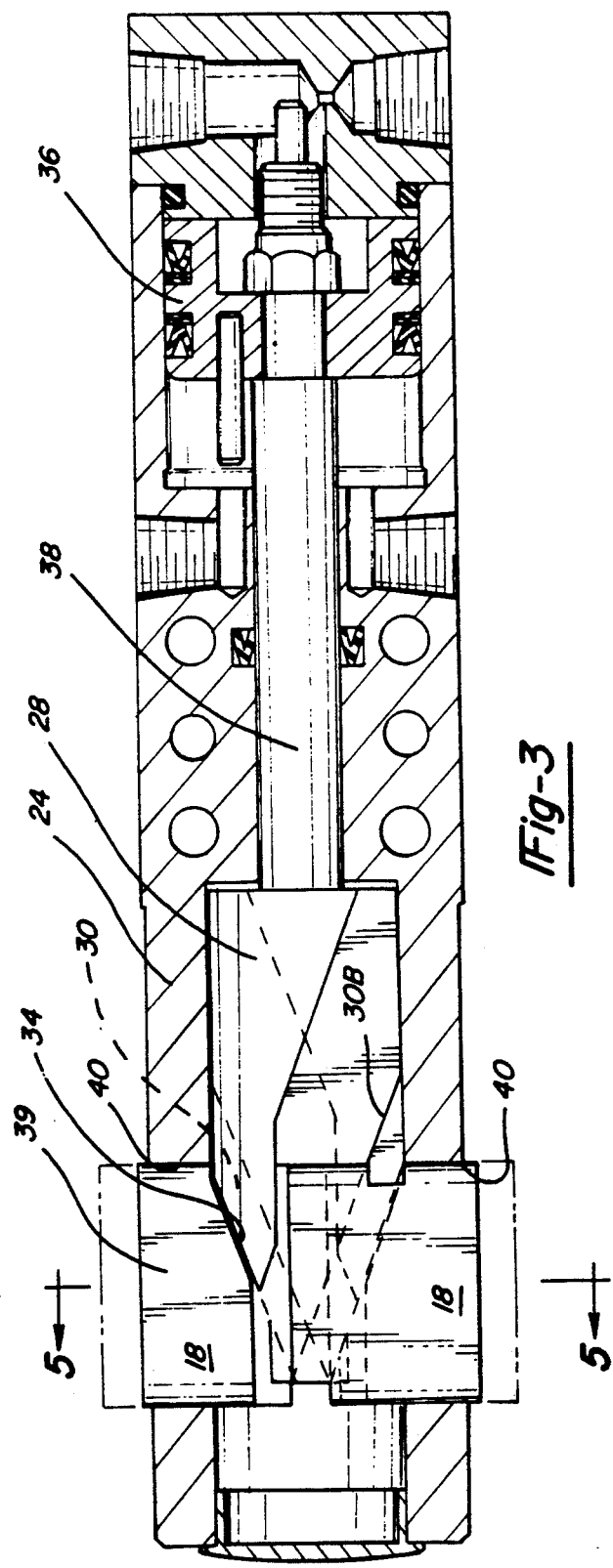
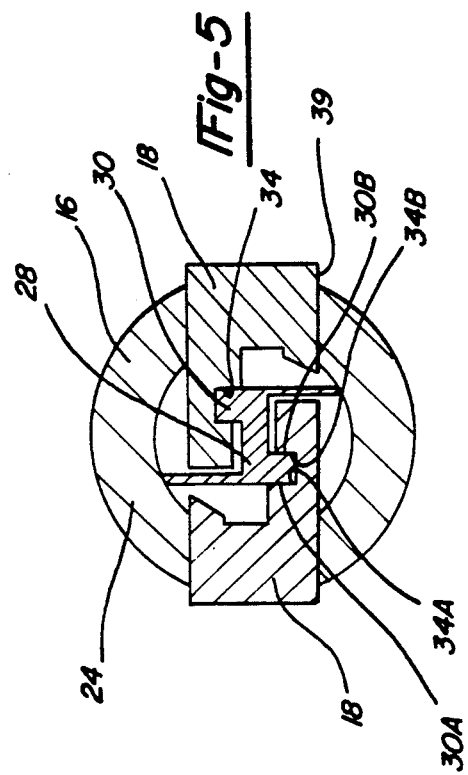
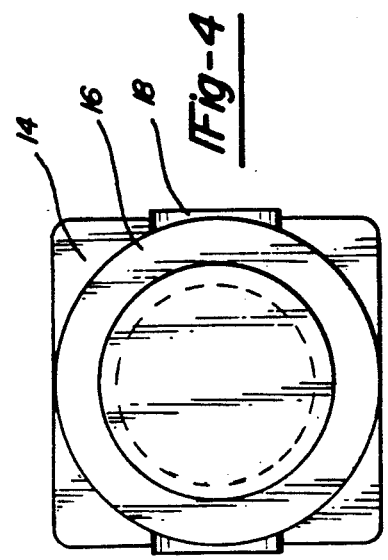

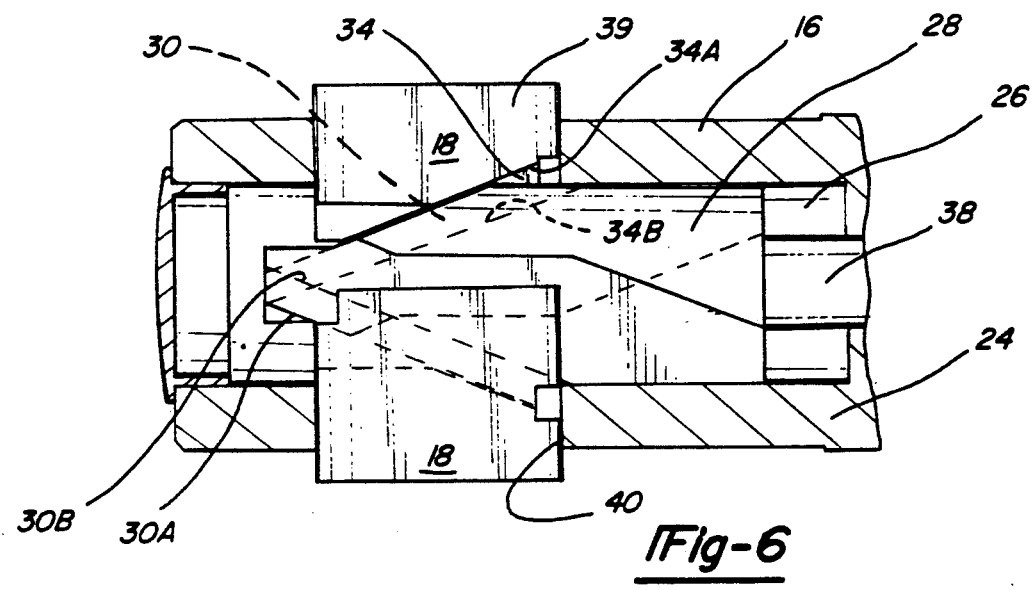
*Fig-6*
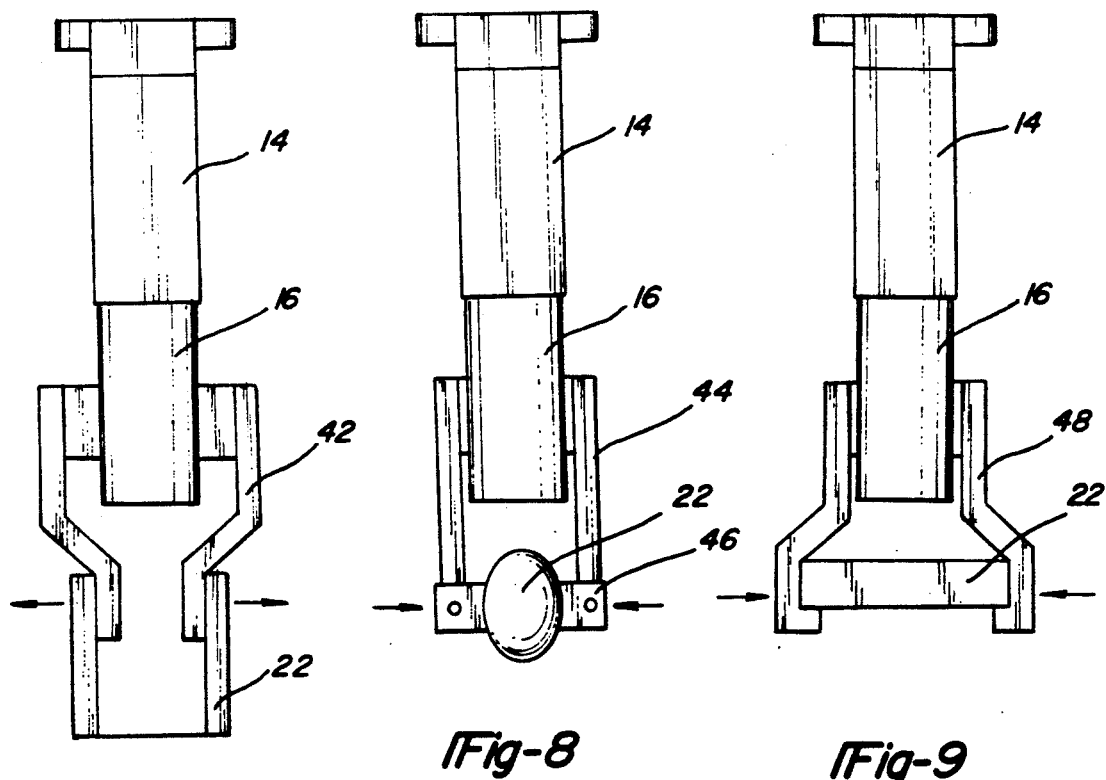
*Fig-7*  *Fig-8*  *Fig-9*

POWERED CLAMP WITH PARALLEL JAWS

BACKGROUND AND SUMMARY OF THE INVENTION

The present invention relates generally to clamping devices and more particularly to a clamping mechanism that utilizes a plurality of translationally displacing jaws for gripping a work piece, either by clamping or by expanding.

The present invention is well suited to applications where it is desired to have a clamping device that utilizes jaws, such as gripping fingers, which translationally actuate for parallel gripping. This gives much greater control than the more common clamping devices which utilize jaws that pivotally displace to engage the work piece. Other clamps have attempted to use jaws that translationally displace, however, they tend to be relatively complicated. Accordingly, the primary object of the present invention is to overcome the disadvantages of existing clamps used for parallel gripping applications. Gripping fingers are displaced, and clampingly engage the work piece, in a purely translational manner, thereby providing for accurate clamping of the work piece. Another advantage of the present invention is the relatively uncomplicated camming mechanism used to accomplish this purely translational displacement. Yet another advantage of the present invention is the camming mechanism's ability to precisely actuate the gripping fingers radially inwardly or outwardly.

These and other advantages of the present invention will become apparent when the following description and claims are taken in conjunction with the subjoined drawings.

BRIEF DESCRIPTION OF THE DRAWINGS

FIG. 3 is a vertical sectional view through the center of the mechanism of FIG. 1 showing the present invention in detail, with the camming member in a fully retracted position and the follower members displaced completely radially inward;

FIG. 4 is an end elevational view of the mechanism of FIG. 1;

FIG. 5 is a cross sectional view taken along section 5—5 in FIG. 3 showing engagement of the camming member with the follower members in the retracted position in accordance with the principles of the present invention;

FIG. 6 is a fragmentary view similar to FIG. 5 showing with the camming member in a fully engaged gripping position with the follower members completely displaced radially outward;

FIG. 7 is a schematic representation showing the gripping fingers being outwardly displace to clampingly engage with the interior surfaces of a work piece in accordance with the principles of the present invention;

FIG. 8 is a schematic representation of the present invention showing gripping fingers with soft gripping surfaces for gripping with delicate work pieces; and FIG. 9 is a schematic representation showing the gripping fingers being inwardly displaced to clampingly engage the exterior surfaces of a work piece in accordance with the principles of the present invention.

DETAILED DESCRIPTION OF THE PREFERRED EMBODIMENT

Figure 1:
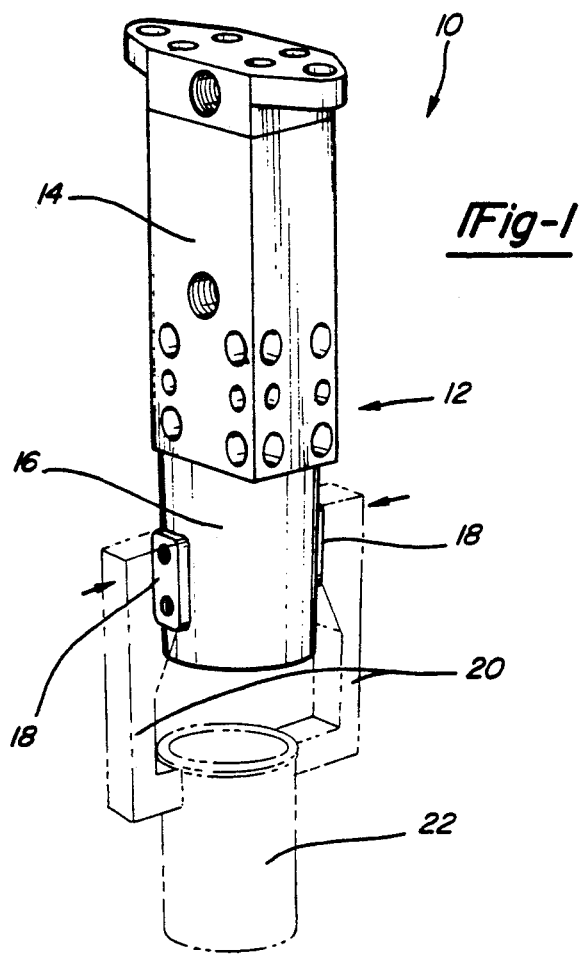
FIG. 1 is a perspective view showing a clamping mechanism in accordance with the principles of the present invention having two gripping fingers that are being radially displaced inwardly to clampingly engage a work piece.

Referring now to the drawings, particularly to FIG. 1, a clamping mechanism 10 that provides parallel gripping in accordance with the principles of the present invention is shown. This clamping mechanism 10 is preferably made of lightweight aluminum, however, a variety of other materials can be used. The clamping mechanism 10 has a housing 12 with a rectangular portion 14 and a cylindrical portion 16. Two follower members 18 are shown extending radially outwardly through the walls of the cylindrical portion 16 of the housing 12 where they attach to jaws such as gripping fingers 20. The gripping fingers 20 shown in FIG. 1 are clamping radially inwardly upon the exterior surfaces of a work piece 22.

Figure 2:
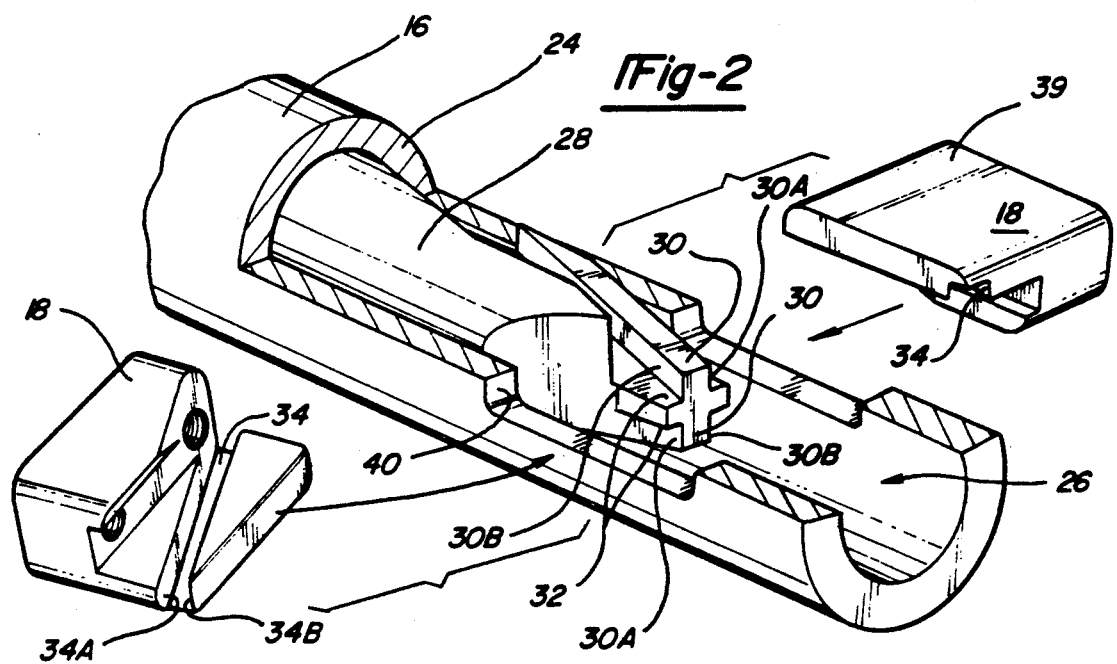
FIG. 2 is an exploded perspective view showing a portion of the clamping mechanism of FIG. 1 with the cylindrical wall broken away to show the camming device that translationally displaces the gripping fingers in accordance with the principles of the present invention.

FIG. 2 illustrates a portion of the cylindrical end of the clamping mechanism 10 with part of the housing wall 24 broken away. Accordingly, a cylindrical chamber 26, which is defined by the interior surface of the housing wall 24, is shown along with a powered camming member 28 that is disposed within the chamber 26. The exterior surface of this camming member 28 is cylindrical and slidably engages with the interior surface of the housing wall 24 for reciprocating movement. As further shown in FIG. 2, the camming member 28 has two keys 30 that perpendicularly depend from a pair of machined surfaces 32 that are parallel to one another, and each key 30 defines a pair of camming surfaces 30A and 30B that are parallel to one another. These camming surfaces 30A and 30B are perpendicular with respect to the machined surfaces 32, and are oriented at 20 degrees with respect to a vertical plane passing through the axial axis of camming member 28, as the camming member is shown in FIG. 2. Each key 30 engages with a corresponding slot 34 in the follower member 18 such that the parallel camming surfaces 30A and 30B on each key 30 engage with correspondingly parallel surfaces 34A and 34B in the slot 34. Thus, when the camming member 28 is actuated in one direction, one camming surface 30A on each of said keys 30 engages the following surface 34A adjacent to it, thereby displacing each follower member 18 in a radial direction. Conversely, when the camming member 28 is actuated in the opposite direction, the other camming surface 30B on each key 30 engages the following surface 34B adjacent to it, thereby displacing each follower member 18 in an opposite radial direction.

As shown in FIG. 3, the camming member 28 is axially displaced, in either direction, by a pneumatically or hydraulically driven piston 36 that is coupled to the camming member 28 by a piston rod 38. FIG. 3 illustrates the camming member 28 in a fully retracted position such that the follower members 18 are displaced completely radially inwardly. As piston 39 actuates the camming member 28, driving it to the left as oriented in FIG. 3, the camming surface 30A facing outwardly on each key 30 cams the adjacent follower surface 34A.

Accordingly, both follower members 18 are uniformly and equally displaced radially outwardly at the same rate with respect to the camming member 28. When the camming member 28 is completely displaced to the left, as shown in FIG. 6, the camming members 28 are displaced completely radially outwardly.

Note that in the fully displaced position, camming surfaces 30A and 30B on the keys 30 maintain engagement along a significant length of the following surfaces 34A and 34B, that is substantially greater than the width of the slot 34. This engagement provides stability to the follower members 18, and therefore to the gripping fingers 20 attached to the follower members 18, and also significantly reduces the tendency of the followers to bind in the complementary shaped radial passages 40 in the housing wall 24 in which the followers are slidably disposed. Moreover, as the follower members 18 are stroked from their inward position in FIG. 3 to their outward position in FIG. 6, the housing walls 24 at the passages 40 within the housing 12 are of sufficient thickness to maintain constant contact with a large majority of the follower member's exterior surface 39 to further stabilize same. Accordingly, gripping fingers 20 that attach to the follower members 18 displace radially inwardly and outwardly in a purely translational manner and remain stable as the gripping fingers 20 engage a work piece 22.

FIG. 4 illustrates an end view of the left hand portion of the embodiment shown in FIG. 3. This view further illustrates the location of the follower members 18 with respect to the housing 12 when the follower members 18 are completely displaced inwardly. FIG. 5 is a cross sectional view taken along section 5—5 in FIG. 3 that shows the follower members 18 engaging both the camming member 28 and the interior surface of the housing wall 24 along its cylindrical portion 16. The camming surfaces 30A and 30B of the keys 30 are engaging following surfaces 34A and 34B within the slot 34; the exterior surfaces 39 of the follower members 18 are engaging with the correspondingly shaped radial passages 40.

FIGS. 7, 8 and 9 illustrate the use of inside gripping fingers 42, outside gripping fingers 44 with soft gripping surfaces 46, and outside gripping fingers 48, respectively. These figures illustrate the parallel nature of a two jaw clamping mechanism 10, however, it should be understood that more than two jaws can be used in a parallel gripping application. Regardless of the number of jaws utilized, parallel gripping can be achieved in accordance with the principles of the present invention by orienting gripping fingers 20 at a constant radius about a single axial axis and displacing them radially in a purely translational manner. Thus in a three-finger version there would be three circumferentially spaced followers each having slots, and a camming member having three circumferentially spaced keys, cooperating in the same way as disclosed herein.

While it will be apparent that the preferred embodiment of the invention disclosed is well calculated to provide the advantages above stated, it will be appreciated that the invention is susceptible to modification, variation and change without departing from the proper scope or fair meaning of the subjoined claims.

I claim:

1. A gripping means for removably gripping an object by engagement with surfaces upon said object, comprising:

(a) a housing, said housing providing support for said gripping means;
(b) at least two jaws for gripping engagement with said surfaces upon said object, said jaws being oriented about a single axial axis such that each of said jaws is located at an equal radial distance from said axis;
(c) camming means for displacing said jaws radially with respect to said axial axis, said camming means having:
a camming member disposed within a cavity defined by said housing, said camming member being movable in a direction substantially parallel to said axial axis;
at least two follower members, each of said follower members being fixedly attached to one of said jaws, said follower members engaging said camming member such that as said camming member is moved in said direction substantially parallel to said axis, said follower members, are radially displaced without contacting one another;
(d) guiding means for guiding the displacement of said follower members, said guiding means having guiding surfaces defining a plurality of passages through which said follower members are displaced, each of said guiding surfaces slidably engaging a portion of an exterior surface on one of said follower members thereby preventing movement of said follower members in any direction other than the direction of said displacement; and
(e) actuating means for moving said camming member in either direction along said axial axis.

2. The invention of claim 1 wherein said jaws are gripping fingers.

3. The invention of claim 1 wherein said jaws radially displace outwardly to engage interior surfaces of an object, thereby serving as inside clamping jaws.

4. The invention of claim 1 wherein said jaws displace radially inwardly to engage exterior surfaces of an object, thereby serving as outside gripping jaws.

5. The invention of claim 1 wherein said jaws have a soft gripping material for jaw surfaces that engage said objects thereby preventing gripping engagement with said object from damaging said object.

6. The invention of claim 1 wherein said gripping means is made of a metal.

7. The invention of claim 1 wherein said actuating means is a pneumatically driven piston that is coupled to said camming member.

8. The invention of claim 1 wherein said camming member has at least two keys that depend from the camming member to define two parallel camming surfaces on each of said keys.

9. The invention of claim 8 wherein said keys engage with said follower members and uniformly displace the follower members radially outwardly at the same rate with respect to the camming member.

10. The invention of claim 8 wherein said follower members have surfaces defining a slot within each of said follower members, said surfaces engaging said camming surfaces on said keys.

11. The invention of claim 10 wherein each of said camming surfaces maintains engagement with a portion along the length of said surfaces defining said slot that is substantially greater than the width of said slot.

12. The invention of claim 1 wherein a cross section of said follower members, taken transverse to the direction of said radial displacement, is generally rectangular with rounded corner portions.

13. The invention of claim 1 wherein a portion of said camming member is cylindrical, said cylindrical portion being axially concentric with said axial axis.

14. An improved gripping means for removably gripping an object having at least two jaws that engage surfaces upon said object, said improvement comprising:
   (a) a housing having at least one wall that defines a chamber disposed within said housing and said housing further having surfaces defining a plurality of passages that lead radially outwardly from said chamber through said at least one wall;
   (b) camming means disposed within said chamber for displacing said jaws radially inwardly and outwardly with respect to said chamber;
   (c) a plurality of follower members, each of said follower members depending inwardly from each of said jaws and passing through one of said passages to engage said camming means, said follower members having a shape that corresponds to said passages such that each of said follower members slidingly engage one of said surfaces defining said passages thereby providing the only means for preventing movement of said follower members in any direction other than the direction of said radial displacement; and
   (d) actuating means for actuating said camming means.

15. An improved displacing means for displacing the jaws of a gripping device, said improvement comprising:
   (a) a camming member;
   (b) a plurality of keys depending from said camming member that each define a pair of camming surfaces, said pair of camming surfaces being substantially parallel to one another;
   (c) a plurality of follower members extending from said jaws, each having a pair of follower surfaces that are substantially parallel to one another and define slots within each of said follower members, each of said keys engaging one of said slots, said engagement preventing said follower members from contacting one another;
   (d) actuating means for actuating said camming member in one direction such that one of said pair of camming surfaces on each of said keys engages the follower surface adjacent to it thereby displacing each of said jaws in a first direction, and for actuating said camming member in an opposite direction such that the other camming surface on each of said keys engages the follower surface adjacent to it thereby displacing each of said jaws in a direction opposite to said first direction; and
   (e) guiding means for guiding the displacement of said follower members, said guiding means having guiding surfaces defining a plurality of passages through which said follower members are displaced, each of said guiding surfaces engaging a portion of an exterior surface on one of said follower members thereby independently preventing movement of said follower members in any direction other than the direction of said displacement.

* * * * *

UNITED STATES PATENT AND TRADEMARK OFFICE
CERTIFICATE OF CORRECTION

PATENT NO. : 5,190,334

DATED : March 2, 1993

INVENTOR(S) : Edwin G. Sawdon

It is certified that error appears in the above-identified patent and that said Letters Patent is hereby corrected as shown below:

Column 2, line 65, "39" should be -- 36 --.

Column 4, line 20, after "said" (first occurrence) insert -- axial --.

Signed and Sealed this

Fourth Day of January, 1994

*Attest:*

BRUCE LEHMAN

*Attesting Officer*     *Commissioner of Patents and Trademarks*